US011900186B2

(12) United States Patent
Mizawa et al.

(10) Patent No.: US 11,900,186 B2
(45) Date of Patent: Feb. 13, 2024

(54) CARD READER

(71) Applicant: NIDEC SANKYO CORPORATION, Nagano (JP)

(72) Inventors: Mamoru Mizawa, Nagano (JP); Keiji Ohta, Nagano (JP); Hiroshige Takeda, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/870,839

(22) Filed: Jul. 22, 2022

(65) Prior Publication Data

US 2023/0035982 A1     Feb. 2, 2023

(30) Foreign Application Priority Data

Jul. 30, 2021   (JP) ................ 2021-126163

(51) Int. Cl.
*G06K 13/08*     (2006.01)
*G06K 7/00*      (2006.01)

(52) U.S. Cl.
CPC ....... *G06K 13/0862* (2013.01); *G06K 7/0069* (2013.01)

(58) Field of Classification Search
CPC .......... G06K 13/0862; G06K 7/0069
USPC ....................................... 235/486
See application file for complete search history.

(56) References Cited

U.S. PATENT DOCUMENTS

| 10,049,311 | B2 | 8/2018 | Kuwaki et al. | |
| 2006/0086793 | A1* | 4/2006 | Oguchi | G06K 13/085 235/441 |
| 2013/0333426 | A1* | 12/2013 | Baker | E05B 47/0012 292/220 |
| 2016/0358044 | A1* | 12/2016 | Kuwaki | G06K 7/0056 |
| 2017/0293778 | A1* | 10/2017 | Miyazawa | G06K 13/06 |
| 2023/0059789 | A1* | 2/2023 | Momose | G06K 13/0862 |

FOREIGN PATENT DOCUMENTS

JP     2016224830     12/2016

* cited by examiner

*Primary Examiner* — Allyson N Trail
(74) *Attorney, Agent, or Firm* — JCIPRNET

(57) ABSTRACT

A card reader includes a card lock mechanism preventing pulling-out of a card jammed in a card conveyance passage, and an operation part for manually releasing lock of the card caused by the card lock mechanism. The card lock mechanism includes a motor, and a lock member which is provided with a blocking pawl for preventing pulling-out of the card and is moved between a contact position where the blocking pawl contacts the card and a retreated position where the blocking pawl is retreated from the card conveyance passage. The operation part includes a rotation member in a tube shape having an inner circumference wall surrounding an output shaft of the motor, and an engaging member provided on the inner circumference wall and extended along a circumferential direction of the output shaft and engageable with an outer peripheral face of the output shaft. The engaging member is elastically deformable.

10 Claims, 12 Drawing Sheets

CARD READER

CROSS REFERENCE TO RELATED APPLICATION

The present invention claims priority under 35 U.S.C. § 119 to Japanese Application No. 2021-126163 filed Jul. 30, 2021, the entire content of which is incorporated herein by reference.

Field of the Invention

At least an embodiment of the disclosure may relate to a card reader which is structured to perform reading and recording of information to a card in which information is recorded.

Background

A conventional card reader is disclosed which includes a card insertion port in which a card is inserted and ejected, a card conveyance passage where the card inserted from the card insertion port is conveyed, and a card lock mechanism structured to prevent pulling-out of the card from the card insertion port when the card is abnormally stopped and jammed in the card conveyance passage. The card lock mechanism includes a motor for transmitting power to a blocking pawl which is to be contacted with a card to prevent pulling-out of the card, and a knob for manually turning an output shaft of the motor. When the blocking pawl is separated from the card by turning the knob, lock of the card is manually released.

In a state that the knob is turned in a lock release direction and the knob has reached an end in a movable range of the blocking pawl on a side opposite to a card, when the knob is further turned in the lock release direction, an excessive force may be applied to an inside of the motor.

SUMMARY

According to an exemplary embodiment of the disclosure, there may be provided a card reader including a card lock mechanism structured to prevent pulling-out of a card jammed in a card conveyance passage from a card insertion port, and an operation part structured to manually release lock of the card caused by the card lock mechanism. The card lock mechanism includes a motor, and a lock member which is provided with a blocking pawl contacted with the card to prevent pulling-out of the card and is moved between a contact position where the blocking pawl is contacted with the card and a retreated position where the blocking pawl is retreated from the card conveyance passage by power transmitted from the motor. The operation part includes a rotation member having a tube shape and having an inner circumference wall surrounding an output shaft of the motor, and an engaging member provided on the inner circumference wall and extended along a circumferential direction of the output shaft and capable of engaging with an outer peripheral face of the output shaft. The engaging member is structured so as to be elastically deformable in a direction perpendicular to the output shaft.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
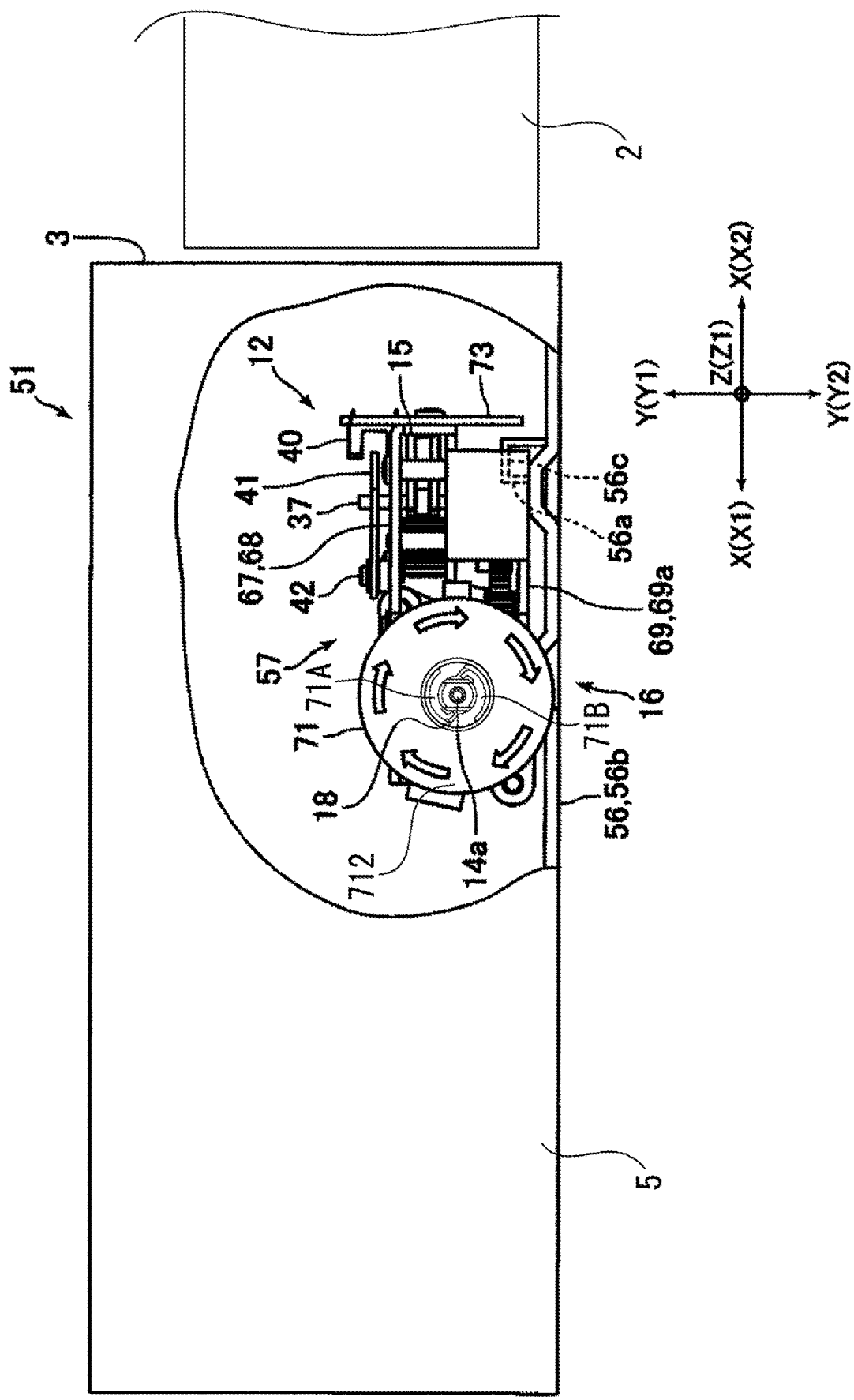
FIG. 1 is a schematic plan view showing a card reader 51 in accordance with an embodiment of the disclosure.
Figure 2:
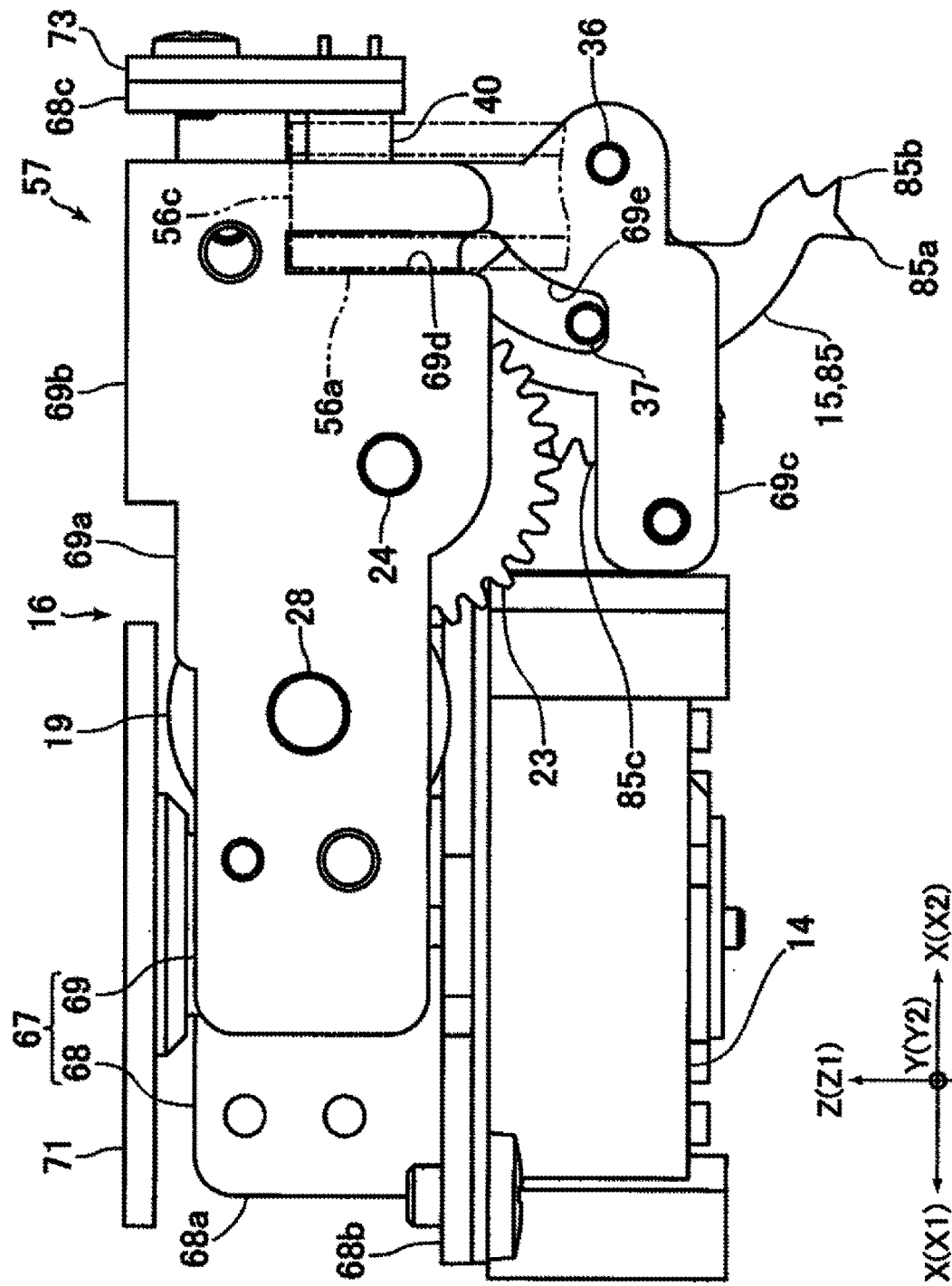
FIG. 2 is a side view showing a card lock mechanism 57 in FIG. 1.

FIG. 1 is a schematic plan view showing a card reader 51 in accordance with an embodiment of the disclosure. FIG. 2 is a side view showing a card lock mechanism 57 in FIG. 1.

A card reader 51 in accordance with an embodiment of the disclosure is a device which performs at least one of reading of information such as magnetic data recorded in a card 2 and recording of information such as magnetic data to the card 2. The card reader 51 is mounted on a predetermined host apparatus such as an ATM (Automated Teller Machine) and is used. The card reader 51 includes a card insertion part provided with a card insertion port 3 into which a card 2 is inserted and from which the card 2 is ejected, and a main body part 5 in which the card insertion part is accommodated. An inside of the card reader 51 is provided with a card conveyance passage (not shown) in which a card 2 inserted from the card insertion port 3 is conveyed. Further, the card reader 51 includes a card lock mechanism 57 which prevents pulling-out of a card 2 from the card insertion port 3 when the card 2 is abnormally stopped in the card conveyance passage by a fraudulent act of a criminal or the like and the card 2 is jammed in the card conveyance passage. In other words, the card lock mechanism 57 is mounted and used in the card reader 51.

A card 2 is a card made of vinyl chloride whose thickness is about 0.7-0.8 mm. A card 2 in this embodiment is a card with a magnetic stripe which is conformed to the international standard (for example, ISO/IEC7811) or JIS standard (for example, JISX6302) and is provided in a substantially rectangular shape whose four corners are rounded. The card 2 is provided with a magnetic stripe in which magnetic data are recorded. Further, the card 2 is incorporated with an IC chip. In this embodiment, the card 2 may be a PET (polyethylene terephthalate) card whose thickness is about 0.18-0.36 mm or may be a paper card having a predetermined thickness.

In this embodiment, a card 2 is conveyed in the "X" direction shown in FIG. 1 and the like. Specifically, a card 2 is taken in the "X1" direction, and the card 2 is ejected in the "X2" direction. In other words, the "X" direction is a conveyance direction of a card 2 which is conveyed in the card conveyance passage, and an "X1" direction is a taking-in direction of a card 2 and an "X2" direction is an ejecting direction of the card 2. Further, in this embodiment, a card 2 is taken into the card reader 51 so that a longitudinal direction of the card 2 and the "X" direction are coincided with each other. Further, the card 2 is conveyed in an inside of the card reader 51 so that a longitudinal direction of the card 2 and the "X" direction are coincided with each other. In other words, the card reader 51 is structured so that a card 2 is conveyed in a longitudinal direction of the card 2 to perform predetermined processing.

Further, the "Z" direction which is perpendicular to the "X" direction is a height direction of the card conveyance passage and is a thickness direction of the card 2 which is conveyed in the card conveyance passage. Further, the "Y" direction which is perpendicular to the "X" direction and the "Z" direction is a width direction of the card conveyance passage and is a width direction of the card 2 which is conveyed in the card conveyance passage. In this embodiment, the card reader 51 is disposed so that the "Z" direction and the vertical direction are coincided with each other. In the following descriptions, the "X" direction is also described as a "front and rear direction", the "Y" direction is also described as a "right and left direction", and the "Z" direction is also described as an "upper and lower direction". Further, the "X1" direction side is also described as a "rear" side, the "X2" direction side is also described as a "front" side, the "Y1" direction side is as a "right" side, the "Y2" direction side is as a "left" side, the "Z1" direction side is as an "upper" side, and the "Z2" direction side is as a "lower part" side.

The card insertion port 3 is attached to a front end face of the main body part 5. The main body part 5 includes a magnetic head (not shown) which performs at least one of reading of magnetic data recorded in a card 2 and recording of magnetic data to a card 2, and IC contacts (not shown) for communicating data with an IC chip incorporated into the card 2.

The magnetic head is disposed so as to face the card conveyance passage from a lower side with respect to the card conveyance passage. Further, the magnetic head is moved up and down between a position where the magnetic head is capable of contacting with a card 2 and a position where the magnetic head is retreated from the card conveyance passage. The IC contacts are disposed so as to face the card conveyance passage from an upper side with respect to the card conveyance passage. Further, the IC contacts are fixed to an IC contact block. The IC contact block is connected with an IC contact block drive mechanism, and the IC contacts are moved up and down between a position where the IC contacts are capable of contacting with a card 2 and a position where the IC contacts are retreated from the card conveyance passage.

The main body part 5 includes conveyance rollers (not shown) structured to abut with a card 2 and convey the card 2, and pad rollers (not shown) which are oppositely disposed to the conveyance rollers. The conveyance roller is disposed so as to face the card conveyance passage from an upper side. The pad roller is disposed so as to face the card conveyance passage from a lower side.

A main body frame 56 of the card reader 51 is provided with an engaging wall part 56*a* engaged with an engaging groove 69*d* described below which is defined in the card lock mechanism 57. The engaging wall part 56*a* is provided so as to stand up from an upper face part which structures an upper face portion of the card conveyance passage toward an upper side. Further, the engaging wall part 56*a* is provided in a flat plate shape and is disposed so that its thickness direction and the front and rear direction are coincided with each other. A left end of the engaging wall part 56*a* is connected with a side wall part 56*b* structuring a left side face of the main body frame 56. Further, a right end of the engaging wall part 56*a* is connected with a wall part 56*c* which is provided in a flat plate shape. The wall part 56*c* is provided so as to stand up from the upper face part structuring the upper face portion of the card conveyance passage toward an upper side and is disposed so that its thickness direction and the right and left direction are coincided with each other.

Figure 3:
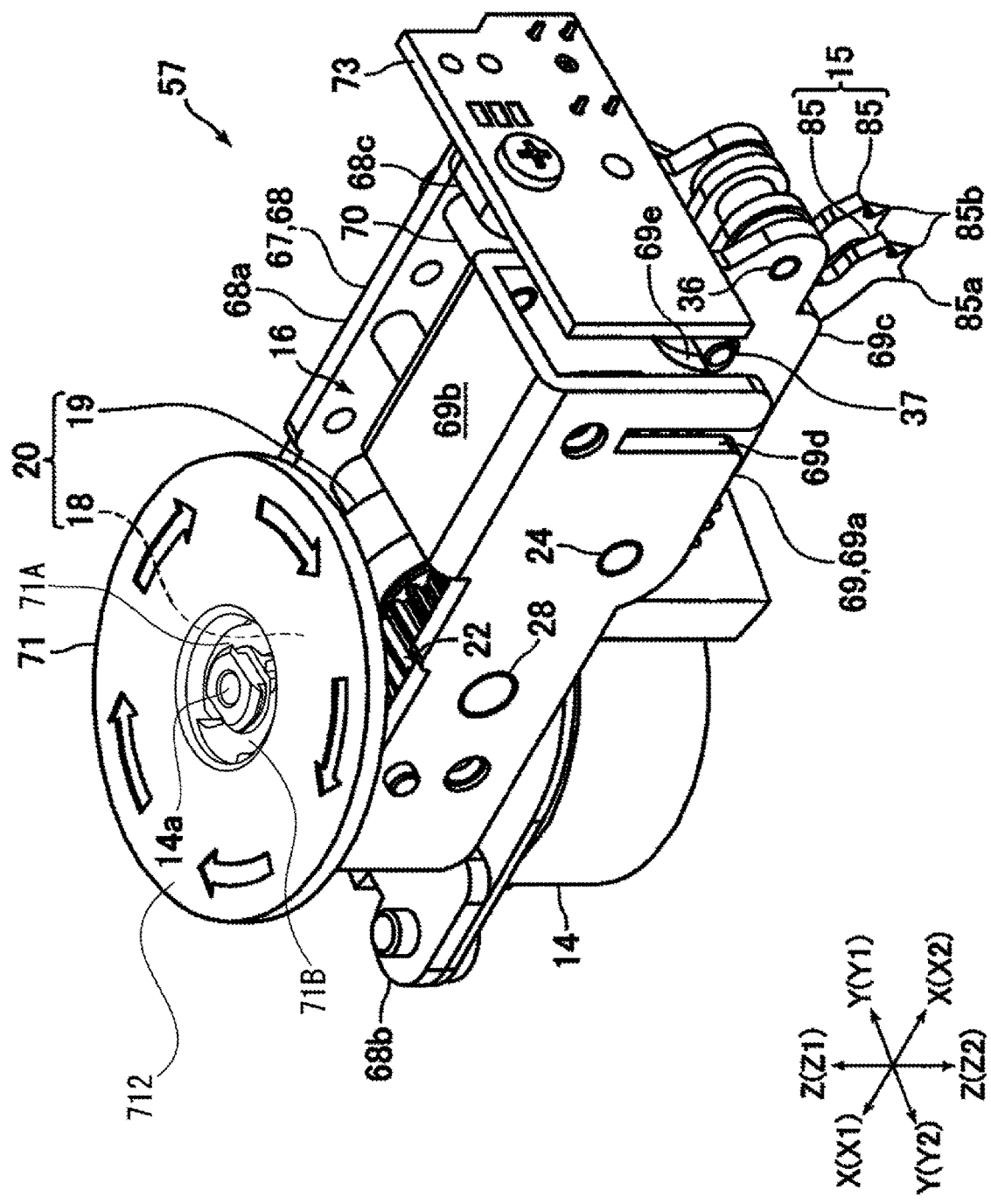
FIG. 3 is a perspective view showing the card lock mechanism 57 in FIG. 2.
Figure 4:
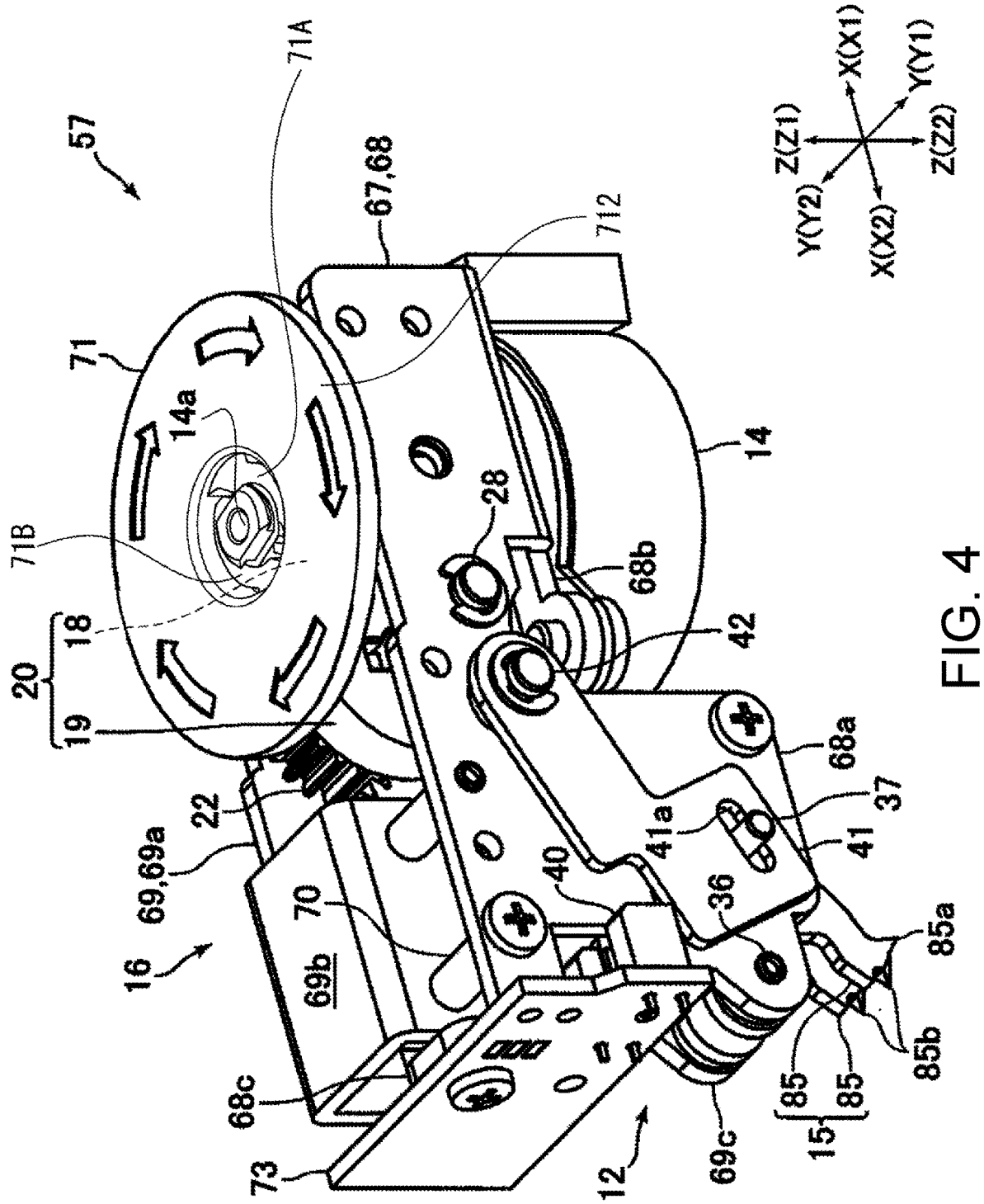
FIG. 4 is a perspective view showing the card lock mechanism 57 in FIG. 3 which is viewed from another direction.
Figure 5:
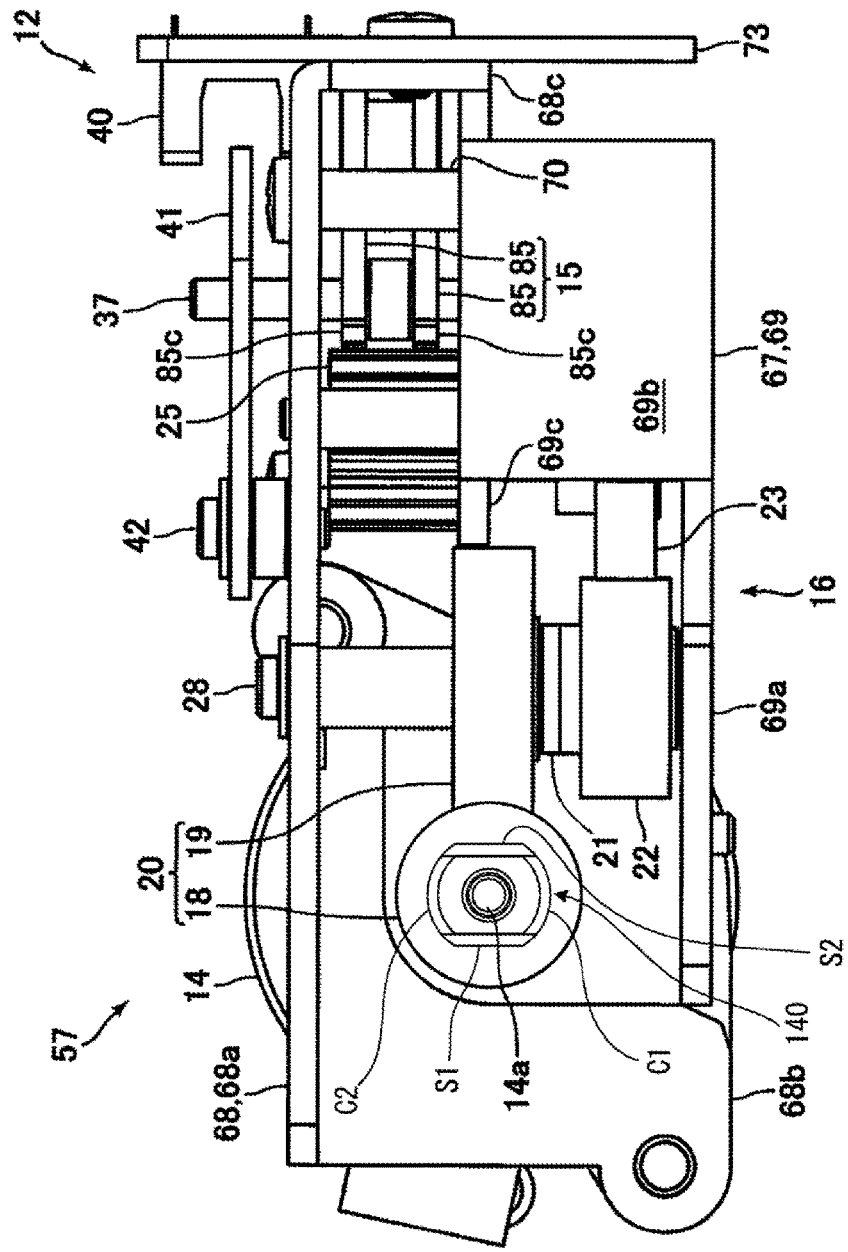
FIG. 5 is a plan view showing a state that a knob 71 is detached from the card lock mechanism 57 shown in FIG. 2.
Figure 5:
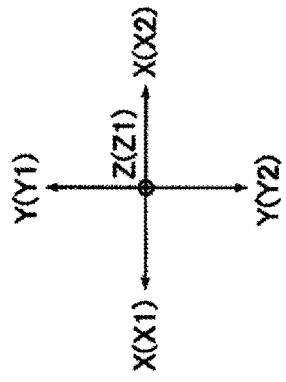
Figure 6:
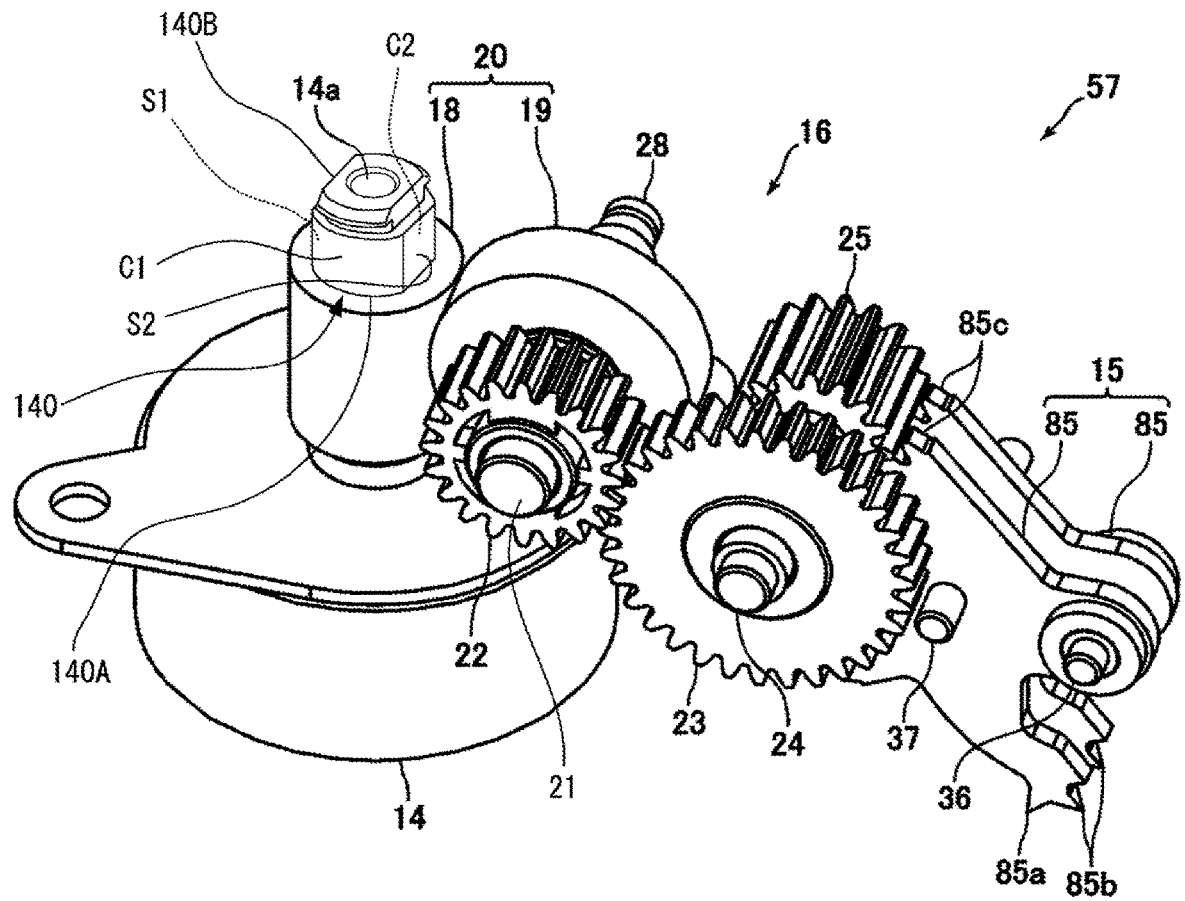
FIG. 6 is a perspective view showing a state that a support frame 67, the knob 71 and the like are detached from the card lock mechanism 57 shown in FIG. 3 and which is viewed from another direction.
Figure 6:
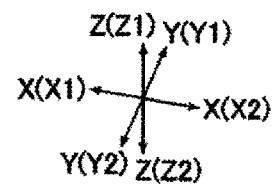
Figure 7:
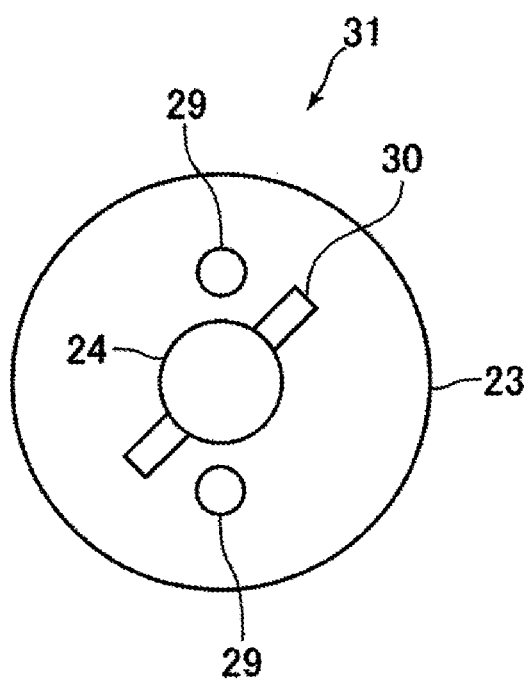
FIG. 7 is an explanatory schematic view showing a structure of a pin clutch 31 which is disposed between a spur gear 23 and a rotation shaft 24 shown in FIG. 6.
Figure 7:
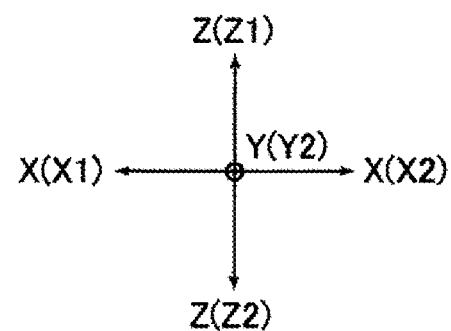
Figure 8:
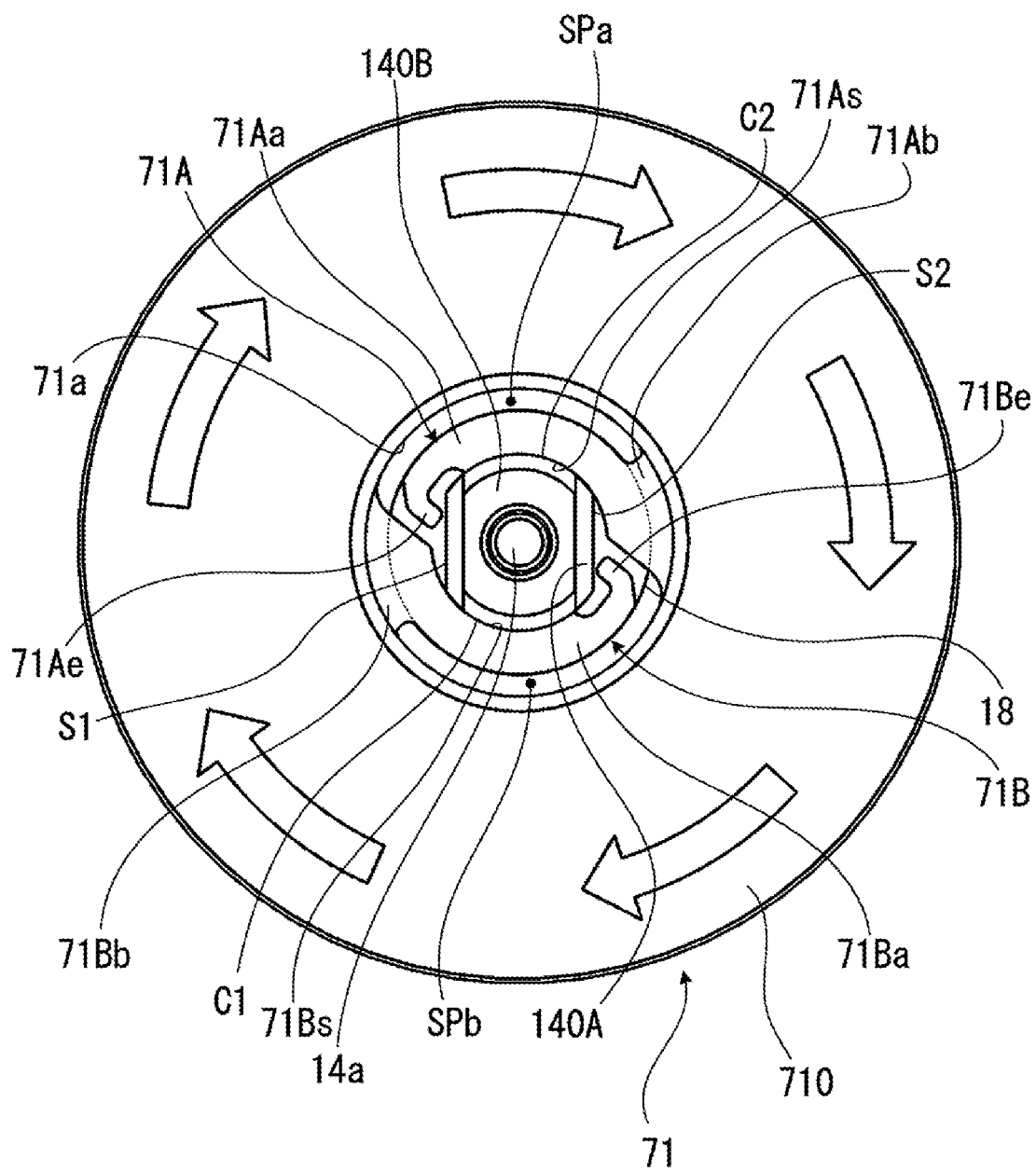
FIG. 8 is an enlarged plan view showing the vicinity of the knob 71 of the card lock mechanism 57 shown in FIG. 1.
Figure 9:
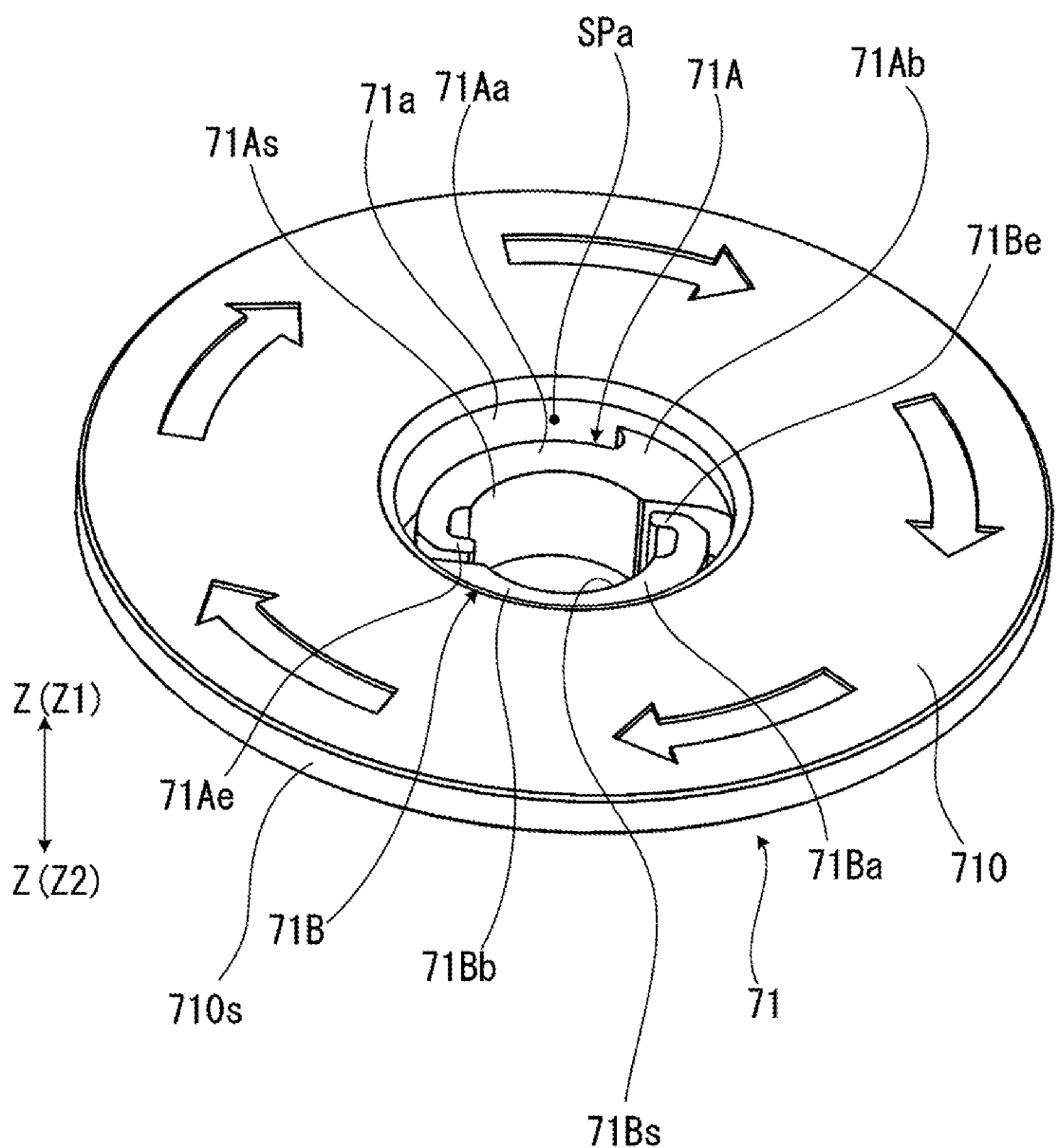
FIG. 9 is a perspective view showing only the knob 71 in FIG. 8 which is viewed from an upper side.
Figure 10:
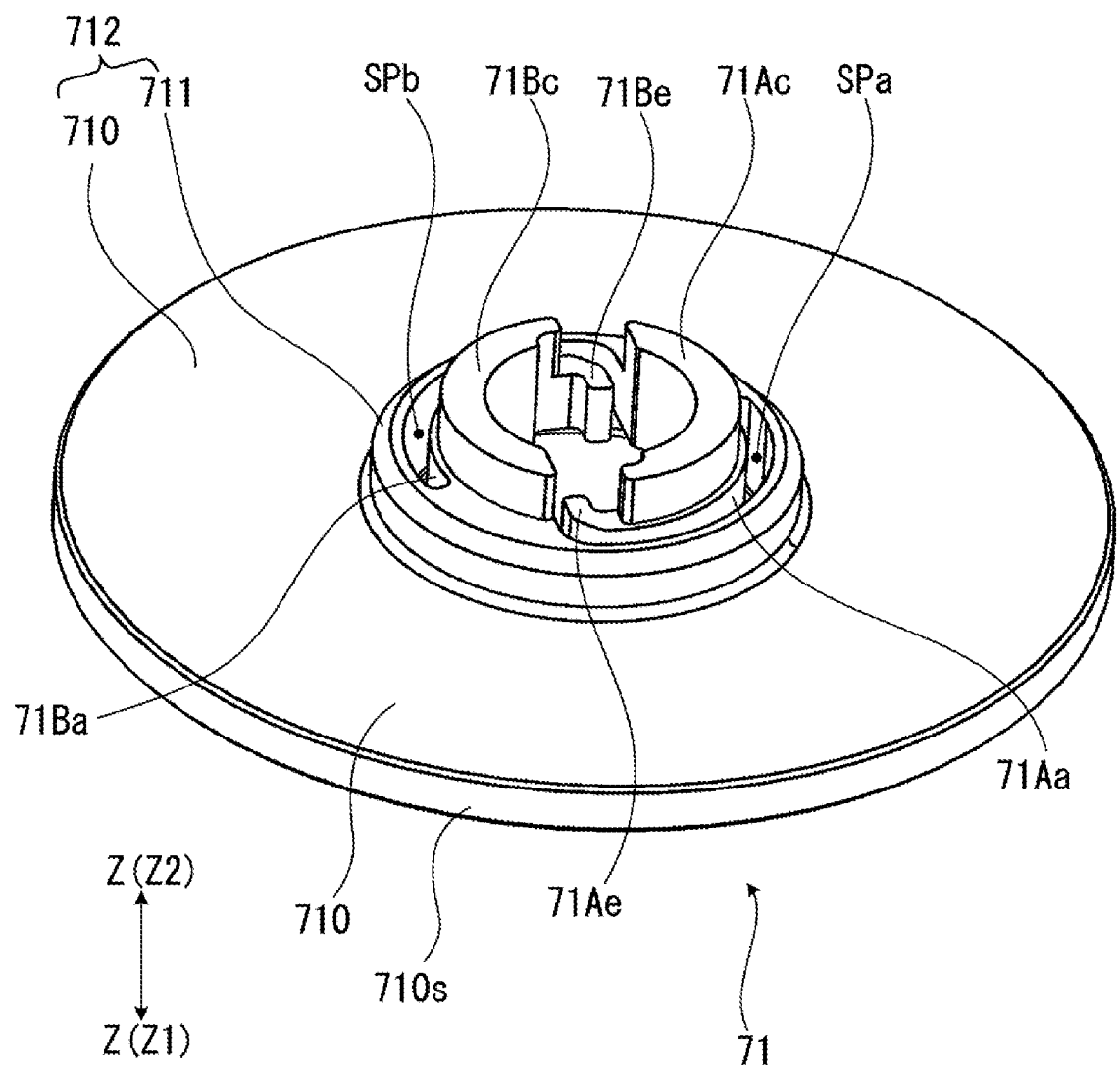
FIG. 10 is a perspective view showing the knob 71 in FIG. 9 which is viewed from a lower side.
Figure 11:
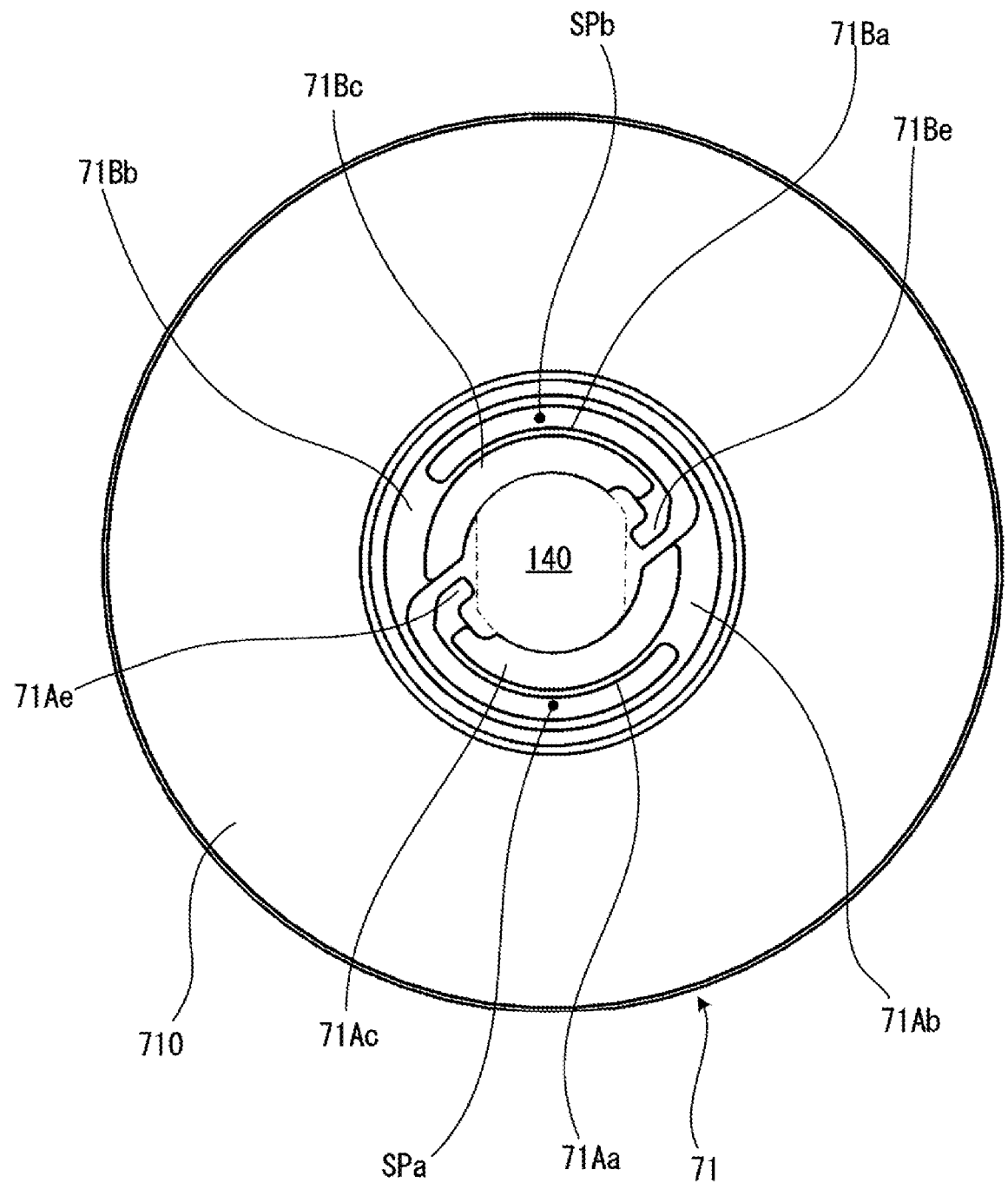
FIG. 11 is a plan view showing the knob 71 in FIG. 9 which is viewed from a lower side.

FIG. 3 is a perspective view sowing the card lock mechanism 57 in FIG. 2. FIG. 4 is a perspective view showing the card lock mechanism 57 in FIG. 3 which is viewed from another direction. FIG. 5 is a plan view showing a state that a knob 71 is detached from the card lock mechanism 57 shown in FIG. 2. FIG. 6 is a perspective view showing a state that a support frame 67, a knob 71 and the like are detached from the card lock mechanism 57 shown in FIG. 3 and which is viewed from another direction. FIG. 7 is an explanatory schematic view showing a structure of a pin clutch 31 which is disposed between a spur gear 23 and a rotation shaft 24 shown in FIG. 6. FIG. 8 is an enlarged plan view showing the vicinity of the knob 71 of the card lock mechanism 57 shown in FIG. 1. FIG. 9 is a perspective view showing only the knob 71 in FIG. 8 which is viewed from an upper side. FIG. 10 is a perspective view showing the knob 71 in FIG. 9 which is viewed from a lower side. FIG. 11 is a plan view showing the knob 71 in FIG. 9 which is viewed from a lower side.

The card lock mechanism 57 is disposed on an upper side with respect to the card conveyance passage. The card lock mechanism 57 includes a detection mechanism 12, a motor 14, a lock member 15 and a power transmission mechanism 16. Further, the card lock mechanism 57 includes a support frame 67 to which the detection mechanism 12, the motor 14, the lock member 15 and the power transmission mechanism 16 are attached. The support frame 67 is structured of two frames, i.e., a first frame 68 and a second frame 69, and a connecting shaft 70 for connecting the first frame 68 with the second frame 69. The first frame 68 and the second frame 69 are defined by bending a metal plate such as a steel plate in a predetermined shape.

The first frame 68 is structured of a side face part 68*a* in a flat plate shape structuring a right side face of the support frame 67, a motor fixing part 68*b* in a flat plate shape to which the motor 14 is fixed, and a board fixing part 68*c* in a flat plate shape to which a sensor board 73 described below is fixed. The side face part 68*a* is disposed so that its thickness direction and the right and left direction are coincided with each other. The motor fixing part 68*b* is disposed so that its thickness direction and the upper and lower direction are coincided with each other. Further, the motor fixing part 68*b* is connected with a rear end side of a lower end of the side face part 68*a* and is extended toward a left side from the rear end side of the side face part 68*a*. The board fixing part 68*c* is disposed so that its thickness direction and the front and rear direction are coincided with each other. Further, the board fixing part 68*c* is connected with a front end of the side face part 68*a* and is extended toward a left side from the front end of the side face part 68*a*.

The second frame 69 is structured of a side face part 69*a* in a flat plate shape structuring a left side face of the support frame 67, an upper face part 69*b* in a flat plate shape connected with an upper end face of the side face part 69*a*, and an inner side face part 69*c* in a flat plate shape disposed in parallel to the side face part 69*a*. The side face part 69*a* is disposed so that its thickness direction and the right and left direction are coincided with each other. The upper face part 69*b* is disposed so that its thickness direction and the upper and lower direction are coincided with each other. Further, the upper face part 69*b* is connected with a front end side of an upper end of the side face part 69*a* and is extended toward a right side from the front end side of the side face part 69*a*. The inner side face part 69*c* is disposed so that its thickness direction and the right and left direction are coincided with each other. Further, the inner side face part 69*c* is connected with a right end of the upper face part 69*b* and is extended toward a lower side from the right end of the upper face part 69*b*. The connecting shaft 70 is disposed so that an axial direction of the connecting shaft 70 and the right and left direction are coincided with each other. Further, the connecting shaft 70 is disposed between the side face part 68*a* and the inner side face part 69*c*.

The side face part 69*a* (in other words, a left side face of the support frame 67) is provided with an engaging groove 69*d* in a slit shape whose longitudinal direction is the upper and lower direction. The engaging groove 69*d* is defined from a lower end face of the side face part 69*a* toward an upper side. Further, the engaging groove 69*d* is defined on a front end side of the side face part 69*a* so as to penetrate through the side face part 69*a* in the right and left direction. A width in the front and rear direction of the engaging groove 69*d* is set to be substantially equal to a thickness (thickness in the front and rear direction) of the engaging wall part 56*a* of the main body frame 56. As shown in FIG. 2, the engaging groove 69*d* is engaged with the engaging wall part 56*a*. In this embodiment, the side face part 69*a* is fixed to the side wall part 56*b* of the main body frame 56 by screws not shown and thereby, the card lock mechanism 57 is fixed to the main body frame 56.

The motor 14 is disposed so that an axial direction of an output shaft 14*a* of the motor 14 and the upper and lower direction are parallel to each other, and the motor 14 is fixed to the motor fixing part 68*b* of the support frame 67 so that the output shaft 14*a* is protruded to the upper side. As shown in FIGS. 5 and 6, the power transmission mechanism 16 includes a worm gear 20 structured of a screw gear 18 and a helical gear 19. Further, the power transmission mechanism 16 includes a rotation shaft 21, a spur gear 22, a spur gear 23, a rotation shaft 24 and a spur gear 25. The spur gear 25 is engaged with a sector gear 85*c* provided in a lock plate 85 described below which structures a lock member 15. As shown in FIG. 5, the power transmission mechanism 16 is disposed between the side face part 68*a* and the side face part 69*a* in the right and left direction.

The rotation shaft 21 is provided in a cylindrical tube shape, which is long and slender, and is disposed so that an axial direction of the rotation shaft 21 and the right and left direction are coincided with each other. A fixed shaft 28 is inserted on an inner peripheral side of the rotation shaft 21, and the fixed shaft 28 is fixed to the support frame 67 so that an axial direction of the fixed shaft 28 and the right and left direction are coincided with each other. The helical gear 19 is fixed at a substantially center position of the rotation shaft 21, and the spur gear 22 is fixed on a left end side of the rotation shaft 21. In other words, the spur gear 22 is disposed on a left side with respect to the helical gear 19. Further, the helical gear 19 is disposed on a front side with respect to the screw gear 18, and the rotation shaft 21 is disposed on a front side with respect to the screw gear 18. In other words, the rotation shaft 21 is disposed on a front side with respect to the output shaft 14*a*.

The rotation shaft 24 is disposed so that an axial direction of the rotation shaft 24 and the right and left direction are coincided with each other and is rotatably held by the support frame 67. The rotation shaft 24 is disposed between an upper end of the motor 14 and a lower end of the motor 14 in the upper and lower direction. Further, the rotation shaft 24 is disposed on a front side with respect to the rotation shaft 21. The spur gear 23 is held on a left end side of the rotation shaft 24 so as to be relatively turnable with respect to the rotation shaft 24 and is disposed on a left side with respect to the helical gear 19. The spur gear 25 is fixed to a right end side of the rotation shaft 24. The spur gear 25 is disposed between the side face part 68*a* and the inner side face part 69*c* in the right and left direction. Further, the spur gear 25 is disposed on a right side with respect to the helical gear 19.

As shown in FIG. 7, a right side face of the spur gear 23 is fixed with two gear side pins 29 in a columnar shape so as to protrude to the right direction. The two gear side pins 29 are fixed to the spur gear 23 at a pitch of 180° with the rotation shaft 24 as a center. The rotation shaft 24 is fixed with a shaft side pin 30 which is protruded to both sides in its radial direction. The shaft side pin 30 is disposed on a right side with respect to the spur gear 23 so as to be capable of contacting with the two gear side pins 29. The two gear side pins 29 and the shaft side pin 30 structure a pin clutch 31 by which power transmission between the spur gear 23 and the rotation shaft 24 is connected and disconnected in a power transmission path between the motor 14 and the lock member 15.

As shown in FIG. 5, the lock member 15 is disposed between the side face part 68*a* and the side face part 69*a* in the right and left direction. Specifically, the lock member 15 is disposed between the side face part 68*a* and the inner side face part 69*c* in the right and left direction. Further, the lock member 15 is disposed on a right side with respect to the helical gear 19. As shown in FIGS. 3, 4 and 6, the lock member 15 is provided with two lock plates 85 each of which is provided with two blocking pawls 85*a* and 85*b* for contacting with a card 2 and preventing pulling-out of the card 2. The lock plate 85 is provided with a sector gear 85*c* which is engaged with the spur gear 25 in addition to the blocking pawls 85*a* and 85*b*. The lock plate 85 is provided in a flat plate shape and is disposed so that a thickness direction of the lock plate 85 and the right and left direction are coincided with each other.

A front end side portion of the lock plate 85 is turnably held by a fixed shaft 36 which is fixed to the support frame 67. The fixed shaft 36 is disposed so that an axial direction of the fixed shaft 36 and the right and left direction are coincided with each other. Further, the fixed shaft 36 is disposed on a front side with respect to the rotation shaft 24. The two lock plates 85 are held by the fixed shaft 36 in a state that they are separated from each other with a predetermined distance therebetween in the right and left direction.

The blocking pawls 85a and 85b are provided on a lower end side of the lock plate 85 and is disposed on a rear side with respect to the fixed shaft 36. Further, the blocking pawl 85a is disposed on a rear side with respect to the blocking pawl 85b. Each of the blocking pawls 85a and 85b is, as shown in FIG. 2, provided in a triangular shape whose width becomes narrow as going toward its tip end side when viewed in the right and left direction. In other words, a tip end of each of the blocking pawls 85a and 85b is pointed. The sector gear 85c is provided with a plurality of teeth for engaging with the spur gear 25. The sector gear 85c is provided on a rear end side of the lock plate 85. Specifically, a shape of a rear end side portion of the lock plate 85 when viewed in the right and left direction is a sector shape with the fixed shaft 36 as a center, and the sector gear 85c is provided on a rear end face of the lock plate 85.

The lock member 15 is disposed on an upper side with respect to the card conveyance passage so that the blocking pawls 85a and 85b are capable of contacting with a card 2 from an upper side. The lock member 15 is movable between a contact position where the blocking pawls 85a and 85b are contacted with a card 2 and a retreated position where the blocking pawls 85a and 85b are retreated from the card conveyance passage by power transmitted from the motor 14 through the power transmission mechanism 16. In other words, the lock member 15 is turned by power transmitted from the motor 14 with the fixed shaft 36 as a center and is moved between the contact position and the retreated position. When the lock member 15 is located at the retreated position, the blocking pawls 85a and 85b are disposed on an upper side with respect to the card conveyance passage and do not contact with a card 2. On the other hand, when the lock member 15 is located at the contact position, the tip end sides of the blocking pawls 85a and 85b are capable of contacting with a card 2.

In this embodiment, when the motor 14 is rotated so that the spur gear 25 is turned in a counterclockwise direction in FIG. 6, the lock member 15 is turned in a clockwise direction in FIG. 6 with the fixed shaft 36 as a center, and the lock member 15 is moved from the retreated position toward the contact position. In this case, the blocking pawls 85a and 85b are moved to a lower side. Further, when the motor 14 is rotated so that the spur gear 25 is turned in a clockwise direction in FIG. 6, the lock member 15 is turned in a counterclockwise direction with the fixed shaft 36 as a center, and the lock member 15 is moved from the contact position toward the retreated position. In this case, the blocking pawls 85a and 85b are moved to an upper side.

The lock member 15 is fixed with guide pins 37 which are protruded to both sides in the right and left direction, and one of the guide pins 37 is engaged with a guide groove (not shown) which is defined in the side face part 68a of the first frame 68, and the other of the guide pins 37 is engaged with a guide groove 69e which is defined in the side face part 69c of the second frame 69. The lock member 15 which is moved between the contact position and the retreated position is guided by the guide groove defined in the side face part 68a and the guide groove 69e and the guide pins 37.

As shown in FIG. 2, the blocking pawl 85a is inclined toward a rear side as going toward a lower side when the lock member 15 is located at the contact position. Specifically, when the lock member 15 is located at the contact position, the blocking pawl 85a is protruded toward a lower rear side so that a tip end of the blocking pawl 85a provided in a triangular shape is directed toward a lower rear side. Further, the blocking pawl 85b is inclined toward a front side as going toward a lower side when the lock member 15 is located at the contact position. Specifically, when the lock member 15 is located at the contact position, the blocking pawl 85b is protruded toward a lower front side so that a tip end of the blocking pawl 85b provided in a triangular shape is directed toward a lower front side.

When a pulling-out force to a front side is applied to a card 2 in a state that the blocking pawls 85a and 85b are contacted with the card 2, a turning force in a counterclockwise direction is generated in the lock member 15 and a tip end of the blocking pawl 85a is stuck into the card 2. On the other hand, when a pushing force to a rear side is applied to a card 2 in a state that the blocking pawls 85a and 85b are contacted with the card 2, a turning force in a clockwise direction is generated in the lock member 15 and a tip end of the blocking pawl 85b is stuck into the card 2.

The detection mechanism 12 includes a sensor 40 and a shading member 41 (see FIGS. 4 and 5). The sensor 40 is fixed to the board fixing part 68c of the first frame 68 through the sensor board 73. The shading member 41 is disposed on a right side with respect to the side face part 68a so that its thickness direction and the right and left direction are coincided with each other. Further, the shading member 41 is turnably held by a fixed shaft 42 which is fixed to the side face part 68a. The fixed shaft 42 is disposed so that an axial direction of the fixed shaft 42 and the right and left direction are coincided with each other. The shading member 41 is provided with a cam groove 41a into which a right end side portion of the guide pin 37 is inserted (see FIG. 4), and the shading member 41 is moved together with the lock member 15. Specifically, when the lock member 15 is turned, the shading member 41 is turned with the fixed shaft 42 as a center. Further, the shading member 41 shades a light from a light emitting element to a light receiving element of the sensor 40 when the lock member 15 is located at the retreated position. Therefore, it is detected that the lock member 15 is located at the retreated position by the detection mechanism 12.

An upper end part of the output shaft 14a of the motor 14 is engaged with the knob 71 as an operation part by which the output shaft 14a is manually turned to release lock of a card 2 due to the card lock mechanism 57. Specifically, as shown in FIG. 6, an upper end part of the output shaft 14a of the motor 14 is fixed with an engaged member 140 in a tube shape which is capable of engaging with the knob 71, and the engaged member 140 structures the upper end part of the output shaft 14a. The screw gear 18 is fixed to the output shaft 14a between the engaged member 140 and the motor 14. The engaged member 140 is structured of a large diameter part 140A and a small diameter part 140B which is extended from an upper face of the large diameter part 140A to an upper side and is provided with a plane area smaller than that of the large diameter part 140A. As shown in FIG. 8, an outer peripheral face of the large diameter part 140A of the engaged member 140 is structured, in a state shown in FIG. 8, of a curved face "C1" and a curved face "C2" which are respectively arranged in the right and left direction, a flat face "S1" which connects end edges on a rear side of the curved face "C1" and the curved face "C2" with each other and is parallel to the right and left direction, and a flat face "S2" which connects end edges on a front side of the curved face "C1" and the curved face "C2" and is parallel to the right and left direction. Each locus of the curved face "C1" and the curved face "C2" due to rotation of the output shaft 14a is coincided with one circle with a center of the output shaft 14a as a center. Planar shapes of the engaged member 140 are shapes turnably symmetrical by 180 degrees with the center of the output shaft 14a as a turning center. In other words, the curved face "C1" and the curved face "C2" are set to be curved faces having the same curvature.

As shown in FIGS. 9 and 10, the knob 71 is structured of a cylindrical tube shape with a flange, and its axial direction is coincided with the upper and lower direction. The knob 71 is provided with a rotation member 712 provided in a tube shape as a whole, which includes an inner peripheral part 711 (see FIG. 10) in a cylindrical tube shape whose axial direction is coincided with the upper and lower direction, and a flange part 710 in a circular ring plate shape which is protruded to an outer side in a radial direction from an upper end part of the inner peripheral part 711. An outer peripheral face 710s of the flange part 710 is configured to be a flat face. The engaged member 140 structuring an upper end part of the output shaft 14a of the motor 14 is inserted on an inner side of the inner peripheral part 711 and is surrounded by an inner circumference wall 71a of the inner peripheral part 711. The knob 71 is further provided with two engaging members (engaging member 71A and engaging member 71B) which are provided in the inner circumference wall 71a of the inner peripheral part 711. Each of the engaging member 71A and the engaging member 71B is extended along a circumferential direction (turning direction) of the output shaft 14a and, in addition, is structured so as to be capable of engaging with either of the curved face "C1" and the curved face "C2" which is a part of an outer peripheral face of the engaged member 140.

As shown in FIG. 8, each of the engaging member 71A and the engaging member 71B is disposed between the inner circumference wall 71a of the inner peripheral part 711 and the engaged member 140. The engaging member 71A is provided in a plate shape whose thickness direction is coincided with the upper and lower direction. The engaging member 71A is provided with a root part 71Ab which is protruded from the inner circumference wall 71a, and an arm part 71Aa which is extended from an end of the root part 71Ab along a circumferential direction (counterclockwise direction in FIG. 8) in a circumferential direction of the output shaft 14a. A side face 71As on the engaged member 140 side of the arm part 71Aa is provided in a curved face shape corresponding to each of the curved face "C1" and the curved face "C2" (curved face having the same curvature as the curved face "C1" and the curved face "C2") and, in a state shown in FIG. 8, the side face 71As of the arm part 71Aa is tightly contacted with the curved face "C2".

A shape of the engaging member 71B is coincided with a shape of the engaging member 71A in a case that the engaging member 71A is turned by 180 degrees with a center of the output shaft 14a as a turning center in the plan view shown in FIG. 8. In other words, the engaging member 71A and the engaging member 71B are in a relation of rotational symmetry (twice rotational symmetry) with the center of the output shaft 14a as a rotation center. Specifically, the engaging member 71B is provided in a plate shape whose thickness direction is coincided with the upper and lower direction. The engaging member 71B is provided with a root part 71Bb which is protruded from the inner circumference wall 71a, and an arm part 71Ba which is extended from an end of the root part 71Bb along a circumferential direction (counterclockwise direction in FIG. 8) in a circumferential direction of the output shaft 14a. A side face 71Bs on the engaged member 140 side of the arm part 71Ba is provided in a curved face shape corresponding to each of the curved face "C1" and the curved face "C2" (curved face having the same curvature as the curved face "C1" and the curved face "C2") and, in a state shown in FIG. 8, the side face 71Bs of the arm part 71Ba is tightly contacted with the curved face "C1".

A tip end part 71Ae of the arm part 71Aa of the engaging member 71A is provided narrower than the other portion of the arm part 71Aa. The tip end part 71Ae is structured so as to enter into an inside of an imaginary circle which is indicated by a locus of the engaged member 140 when the output shaft 14a is turned one rotation. Similarly, a tip end part 71Be of the arm part 71Ba of the engaging member 71B is provided narrower than the other portion of the arm part 71Ba. The tip end part 71Be is structured so as to enter into an inside of the imaginary circle.

A space "SPa" is provided between a side face of the arm part 71Aa on the inner circumference wall 71a side and the inner circumference wall 71a. A space "SPb" is provided between a side face of the arm part 71Ba on the inner circumference wall 71a side and the inner circumference wall 71a. Each of the engaging member 71A and the engaging member 71B is structured of elastically deformable material. Since the space "SPa" and the space "SPb" exist, the arm part 71Aa of the engaging member 71A and the arm part 71Ba of the engaging member 71B are respectively displaceable in a direction separated from the engaged member 140 (in a direction perpendicular to the output shaft 14a).

As shown in FIGS. 10 and 11, a part of a lower face of the engaging member 71A is provided with an erected part 71Ac which is protruded to a lower side and is extended along the circumferential direction of the output shaft 14a. A side face of the erected part 71Ac on the engaged member 140 side is provided in a curved shape corresponding to each of the curved face "C1" and the curved face "C2". An end edge of the erected part 71Ac on the engaged member 140 side and an end edge of the engaging member 71A on the engaged member 140 side are overlapped with each other in a plan view. A lower face of the engaging member 71B is provided with an erected part 71Bc which is protruded to a lower side and is extended along the circumferential direction of the output shaft 14a. A side face of the erected part 71Bc on the engaged member 140 side is provided in a curved shape corresponding to each of the curved face "C1" and the curved face "C2". An end edge of the erected part 71Bc on the engaged member 140 side and an end edge of the engaging member 71B on the engaged member 140 side are overlapped with each other in a plan view. Each of lower faces of the erected part 71Ac and the erected part 71Bc is abutted with an upper face of the screw gear 18. The erected part 71Ac and the erected part 71Bc are capable of sliding on the upper face of the screw gear 18.

The engaging member 71A and the engaging member 71B are structured so that the arm part 71Aa and the arm part 71Ba are respectively urged toward the engaged member 140. Therefore, in a state that an external force is not applied to the knob 71, as shown in FIG. 8, the knob 71 is firmly locked in the output shaft 14a by an engagement force of the arm part 71Aa (and the erected part 71Ac) with the curved face "C2" and by an engagement force of the arm part 71Ba (and the erected part 71Bc) with the curved face "C1". In other words, the knob 71 is also rotated in cooperation with rotation of the output shaft 14a.

In this embodiment, when the output shaft 14a of the motor 14 is rotated in a counterclockwise direction in the state shown in FIG. 8, the lock member 15 is turned in a clockwise direction in FIG. 6 with the fixed shaft 36 as a center and thus, the lock member 15 is moved from the retreated position toward the contact position. Further, in the state that the lock member 15 is located at the retreated position, the output shaft 14*a* of the motor 14 is structured so as not to rotate in a clockwise direction in the state shown in FIG. 8.

In order to manually release lock of a card 2 in a state that the lock member 15 is located at the contact position, the rotation member 712 of the knob 71 is turned by hand in a clockwise direction in the state shown in FIG. 8. In the state that the lock member 15 is located at the contact position, the output shaft 14*a* of the motor 14 is able to be rotated in a clockwise direction in the state shown in FIG. 8. Therefore, when the rotation member 712 of the knob 71 is turned in a clockwise direction in the state shown in FIG. 8 that the lock member 15 is located at the contact position, the output shaft 14*a* is turned in cooperation with turning of the knob 71 by an engagement force of the arm part 71Aa (and the erected part 71Ac) with the curved face "C2" and by an engagement force of the arm part 71Ba (and the erected part 71Bc) with the curved face "C1". As a result, the lock member 15 is able to be moved to the retreated position.

On the other hand, a case is assumed that, in the state that the lock member 15 is located at the retreated position, the rotation member 712 of the knob 71 is further turned in the clockwise direction in the state shown in FIG. 8. In this case, the output shaft 14*a* is not easily turned in the clockwise direction. Therefore, only the rotation member 712 starts to turn against the engagement force of the engaging member 71A with the engaged member 140 and the engagement force of the engaging member 71B with the engaged member 140 and then, the tip end part 71Ae of the engaging member 71A is abutted with the outer peripheral face of the engaged member 140, and the tip end part 71Be of the engaging member 71B is abutted with the outer peripheral face of the engaged member 140, and thereby, the engaging member 71A and the engaging member 71B are respectively deformed. As a result, the engagement force of the arm part 71Aa (and the erected part 71Ac) with the curved face "C2" and the engagement force of the arm part 71Ba (and the erected part 71Bc) with the curved face "C1" are released.

Figure 12:
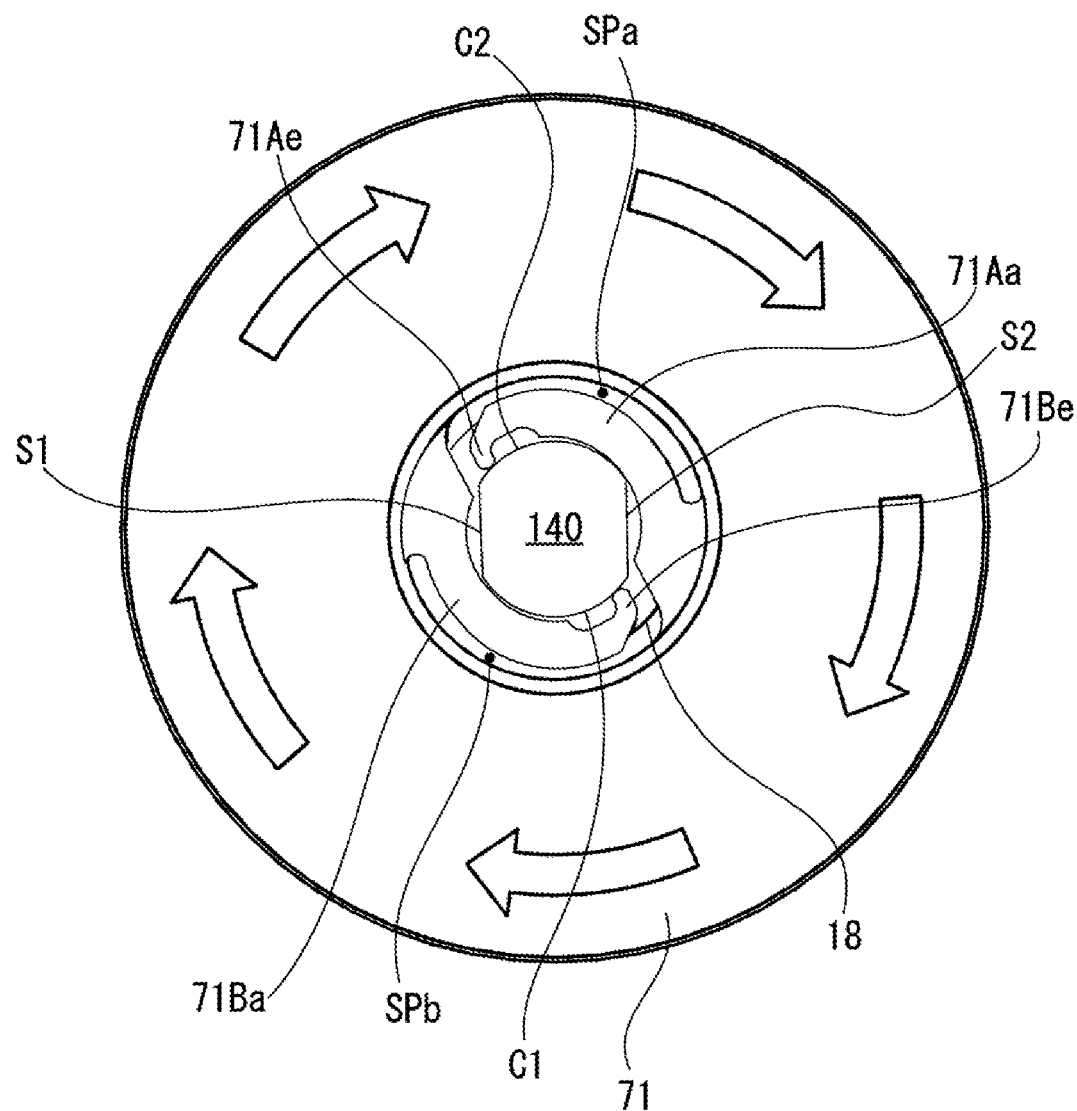
FIG. 12 is a view showing a state that the knob 71 is turned in a clockwise direction from the state shown in FIG. 8 that a lock member 15 is assumed to be located at a retreated position.

FIG. 12 is a view showing a state that the knob 71 is turned in the clockwise direction from the state shown in FIG. 8 that the lock member 15 is assumed to be located at the retreated position. In the state shown in FIG. 12, the arm part 71Aa of the engaging member 71A is moved in a direction separated from the engaged member 140, and the arm part 71Ba of the engaging member 71B is moved in a direction separated from the engaged member 140 and thus, an engagement force of the arm part 71Aa with the curved face "C2" and an engagement force of the arm part 71Ba with the curved face "C1" are released. Therefore, only the knob 71 is easily turned (in other words, idly turned) in the clockwise direction with respect to the output shaft 14*a*. As described above, according to the card lock mechanism 57 in this embodiment, a large force is prevented from applying to the output shaft 14*a* of the motor 14 in a state that the lock member 15 is located at the retreated position, and durability of the card lock mechanism 57 is able to be improved.

In this embodiment, in addition to the engaging member 71A and the engaging member 71B, the erected part 71Ac provided on a lower face of the engaging member 71A of the knob 71 and the erected part 71Bc provided on a lower face of the engaging member 71B of the knob 71 are able to be engaged with the engaged member 140. Therefore, when the lock member 15 is to be moved between the retreated position and the contact position, the engagement force of the knob 71 with the engaged member 140 is able to be sufficiently increased and a turning force of the knob 71 is able to be efficiently transmitted to the output shaft 14*a*. On the other hand, in a case that the knob 71 is turned in the clockwise direction in a state that the lock member 15 is located at the retreated position, the erected part 71Ac and the erected part 71Bc are also deformed in a direction separated from the engaged member 140 and thus, a user is capable of easily recognizing that the knob 71 is idly turned.

Further, the outer peripheral face 710*s* of the flange part 710 which is a portion of the knob 71 operated by hand is configured to be a flat face over the entire periphery. Therefore, a force from fingers is hard to be applied to the flange part 710 when the flange part 710 is turned by fingers. As a result, an excessive force is prevented from being transmitted to the output shaft 14*a*, and durability of the knob 71 and the card lock mechanism 57 is able to be enhanced.

In the embodiment described above, the knob 71 is provided with two engaging members, i.e., the engaging member 71A and the engaging member 71B. However, in a case that an engagement force of the engaged member 140 with the knob 71 is sufficiently secured, the number of the engaging member may be one or may be three or more. However, when two engaging members are provided, in comparison with a case that three or more engaging members are provided, a manufacturing cost is able to be reduced. Further, when two engaging members are provided, the engagement force of the output shaft 14*a* with the knob 71 is able to be easily stabilized and a turning force of the knob 71 is able to be efficiently transmitted to the output shaft 14*a*. Further, an idling torque of the knob 71 is able to be easily stabilized.

The output shaft 14*a* may be provided with an applied part to which an instrument for turning the output shaft 14*a* is applied. The applied part is, for example, a plus-shaped hole for a plus driver which is defined on an upper end face of the output shaft 14*a*, or a minus-shaped hole for a minus driver which is defined on the upper end face of the output shaft 14*a*. The instrument is a plus driver or a coin when the applied part is a plus-shaped hole, and the instrument is a minus driver or a coin when the applied part is a minus-shaped hole. For example, it is conceivable that the rotation member 712 is idly turned in a state that the lock member 15 is located at the contact position due to that the blocking pawls 85*a* and 85*b* are firmly stuck into a card 2 or the like. According to the above-mentioned structure, even in such a case described above, when the instrument is applied to the applied part and utilized, the output shaft 14*a* is able to be turned to separate the blocking pawls 85*a* and 85*b* from a card 2. After the blocking pawls 85*a* and 85*b* are separated from the card 2, when the rotation member 712 is turned, the lock member 15 is able to be moved to the retreated position with less labor in comparison with a case that the output shaft 14*a* is turned by using the instrument.

It may be structured that an outer peripheral face of the engaged member 140 of the output shaft 14*a* is provided with a first recessed part having a shape corresponding to the tip end part 71Ae of the engaging member 71A and a second recessed part having a shape corresponding to the tip end part 71Be of the engaging member 71B, and that the tip end part 71Ae is engaged with the first recessed part and the tip end part 71Be is engaged with the second recessed part. According to this structure, an engagement force of the output shaft 14*a* with the engaging members 71A and 71B is able to be increased by an engagement force of the first recessed part with the tip end part 71Ae and an engagement force of the second recessed part with the tip end part 71Be. As a result, a turning force of the rotation member 712 is able to be efficiently transmitted to the output shaft 14a.

In the embodiment described above, the power transmission mechanism 16 includes the spur gears 23 and 25, and the spur gear 25 is engaged with the sector gears 85c of the lock member 15. However, the power transmission mechanism 16 may be structured so that the spur gear 22 is engaged with the sector gears 85c. In this case, the spur gear 22 is a final gear. Further, in the embodiment described above, the power transmission mechanism 16 includes the spur gears 22, 23 and 25. However, the power transmission mechanism 16 may be provided with a helical gear instead of the spur gears 22, 23 and 25. In this case, the sector gears 85c are provided so as to engage with the helical gear. Further, in the embodiment described above, the lock member 15 is turnably held by the fixed shaft 36. However, the lock member 15 may be fixed to a turning shaft which is turnably held by the support frame 67.

In the embodiment described above, the motor 14 is disposed so that an axial direction of the output shaft 14a and the upper and lower direction are parallel to each other, and the output shaft 14a, the rotation shaft 21, the rotation shaft 24 and the fixed shaft 36 are disposed from a rear side toward a front side in this order in the front and rear direction. However, the disclosure is not limited to this embodiment. For example, the motor 14 is disposed so that an axial direction of the output shaft 14a and the front and rear direction are parallel to each other, and the output shaft 14a, the rotation shaft 21, the rotation shaft 24 and the fixed shaft 36 are disposed from an upper side toward a lower side in this order in the upper and lower direction. Also in this case, the lock plate 85 is provided so that the blocking pawls 85a and 85b are contacted with a card 2 from an upper side. Further, the lock member 15 and the power transmission mechanism 16 are disposed between the side face part 68a and the side face part 69a in the right and left direction. However, a part of components of the power transmission mechanism 16 and the lock member 15 may be disposed on a right side with respect to the side face part 68a or may be disposed on a left side with respect to the side face part 69a.

In the embodiment described above, the card lock mechanism 57 is mounted on the card reader 51 in which a card 2 is processed so that a longitudinal direction of the card 2 and the "X" direction are coincided with each other. However, the disclosure is not limited to this embodiment. For example, the card lock mechanism 57 is mounted on a card reader 51 in which a card 2 is processed so that a shorter direction of the card 2 and the "X" direction are coincided with each other.

As described above, the following embodiments are disclosed in the present specification. In the following embodiments, corresponding structure elements and the like in the embodiment described above are indicated in parentheses. However, the disclosure is not limited to the indicated structure elements and the like.

(1) A card reader (card reader 51) includes a card lock mechanism (card lock mechanism 57) structured to prevent pulling-out of a card (card 2) jammed in a card conveyance passage from a card insertion port (card insertion port 3), and an operation part (knob 71) for manually releasing lock of the card caused by the card lock mechanism. The card lock mechanism includes a motor (motor 14), and a lock member (lock member 15) which is provided with a blocking pawl (blocking pawls 85a and 85b) contacted with the card to prevent pulling-out of the card and is moved between a contact position where the blocking pawl is contacted with the card and a retreated position where the blocking pawl is retreated from the card conveyance passage by power transmitted from the motor. The operation part is provided with a rotation member (rotation member 712) in a tube shape having an inner circumference wall (inner circumference wall 71a) surrounding an output shaft (output shaft 14a) of the motor, and an engaging member (engaging members 71A and 71B) provided on the inner circumference wall and extended along a circumferential direction of the output shaft and capable of engaging with an outer peripheral face of the output shaft. The engaging member is structured so as to be elastically deformable in a direction perpendicular to the output shaft.

According to the above-mentioned structure (1), in a state that the lock member is located at the contact position, when the rotation member including the engaging member which is engaged with the output shaft is turned, a turning force applied to the rotation member is transmitted to the output shaft and the lock member is moved to the retreated position and lock of a card is released. Further, in a state that the lock member has been moved to the retreated position and further rotation of the output shaft is difficult, when the rotation member is further turned, the engaging member is deformed to release engagement with the output shaft and thereby, only the rotation member is turned (idly turned). Therefore, a large force is prevented from applying to the output shaft of the motor and durability of the card lock mechanism is able to be enhanced.

(2) In the card reader described in the above-mentioned structure (1), a plurality of the engaging members is provided in the rotation member.

According to the above-mentioned structure (2), an engagement force of the output shaft with the rotation member is able to be easily stabilized and a turning force of the rotation member is able to be efficiently transmitted to the output shaft. Further, an idling torque of the rotation member is able to be easily stabilized.

(3) In the card reader described in the above-mentioned structure (2), the plurality of the engaging members has a rotationally symmetric shape with a center of the output shaft as a rotation center when viewed in a direction where the output shaft is extended.

According to the above-mentioned structure (3), an engagement force of the output shaft with the rotation member is able to be stabilized and a turning force of the rotation member is able to be efficiently transmitted to the output shaft. Further, an idling torque of the rotation member is able to be easily stabilized.

(4) In the card reader described in the above-mentioned structure (3), the engaging member is provided with a root part (root parts 71Ab and 71Bb) protruded from the inner circumference wall, and an arm part (arm parts 71Aa and 71Ba) extended from one end of the root part in a circumferential direction of the output shaft along the circumferential direction. A space (spaces "SPa" and "SPb") is defined between the arm part and the inner circumference wall, and the arm part is structured so as to be displaceable.

According to the above-mentioned structure (4), an engagement force of the output shaft with the rotation member is able to be stabilized and a turning force of the rotation member is able to be efficiently transmitted to the output shaft. Further, an idling torque of the rotation member is able to be stabilized.

(5) In the card reader described in the above-mentioned structures (1) through (4), the output shaft is provided with an applied part to which an instrument capable of turning the output shaft is applied.

For example, it is conceivable that the rotation member is idly turned in a state that the lock member is located at the contact position due to that the blocking pawl is firmly stuck into a card or the like. According to the above-mentioned structure (5), even in such a case, when the instrument applied to the applied part is utilized, the output shaft is able to be rotated to separate the blocking pawl from a card. After the blocking pawl is separated from the card, when the rotation member is turned, the lock member is able to be moved to the retreated position with less labor in comparison with a case that the output shaft is rotated by using the instrument.

(6) In the card reader described in the above-mentioned structures (1) through (5), the outer peripheral face of the output shaft is provided with a recessed part in a shape corresponding to a tip end of the engaging member, and the tip end of the engaging member is engaged with the recessed part.

According to the above-mentioned structure (6), an engagement force of the output shaft with the engaging member is able to be increased due to engagement of the recessed part with the tip end of the engaging member. As a result, a turning force of the rotation member is able to be efficiently transmitted to the output shaft.

(7) In the card reader described in the above-mentioned structures (1) through (6), an outer peripheral face (outer peripheral face 710s) of the rotation member is configured to be flat.

According to the above-mentioned structure (7), when the rotation member is turned by fingers, a force from fingers is hard to be applied to the rotation member. As a result, an excessive force is prevented from being transmitted to the output shaft, and durability of the rotation member and the card lock mechanism is able to be enhanced.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A card reader comprising:
    a card lock mechanism structured to prevent pulling-out of a card jammed in a card conveyance passage from a card insertion port; and
    an operation part structured to manually release lock of the card caused by the card lock mechanism;
    wherein the card lock mechanism comprises:
        a motor; and
        a lock member, provided with a blocking pawl contacted with the card to prevent pulling-out of the card, the lock member being moved between a contact position where the blocking pawl is contacted with the card and a retreated position where the blocking pawl is retreated from the card conveyance passage by power transmitted from the motor;
    wherein the operation part comprises:
        a rotation member, having a tube shape and having an inner circumference wall surrounding an output shaft of the motor; and
        an engaging member, provided on the inner circumference wall, extended along a circumferential direction of the output shaft and capable of engaging with an outer peripheral face of the output shaft; and
    wherein the engaging member is structured so as to be elastically deformable in a direction perpendicular to the output shaft.

2. The card reader according to claim 1, wherein the rotation member comprises a plurality of the engaging members.

3. The card reader according to claim 2, wherein the plurality of the engaging members has a rotationally symmetric shape with a center of the output shaft as a rotation center when viewed in a direction where the output shaft is extended.

4. The card reader according to claim 3, wherein
    the engaging member comprises:
        a root part, protruded from the inner circumference wall; and
        an arm part, extended from one end of the root part in a circumferential direction of the output shaft along the circumferential direction, and
    a space is defined between the arm part and the inner circumference wall, and
    the arm part is structured so as to be displaceable.

5. The card reader according to claim 1, wherein the output shaft comprises an applied part to which an instrument capable of turning the output shaft is applied.

6. The card reader according to claim 1, wherein
    the outer peripheral face of the output shaft is provided with a recessed part in a shape corresponding to a tip end of the engaging member, and
    the tip end of the engaging member is engaged with the recessed part.

7. The card reader according to claim 1, wherein an outer peripheral face of the rotation member is configured to be flat.

8. The card reader according to claim 4, wherein the output shaft comprises an applied part to which an instrument capable of turning the output shaft is applied.

9. The card reader according to claim 8, wherein
    the outer peripheral face of the output shaft is provided with a recessed part in a shape corresponding to a tip end of the engaging member, and
    the tip end of the engaging member is engaged with the recessed part.

10. The card reader according to claim 9, wherein an outer peripheral face of the rotation member is configured to be flat.

* * * * *